United States Patent
Clunie

(12) 
(10) Patent No.: US 6,588,991 B2
(45) Date of Patent: Jul. 8, 2003

(54) METHOD AND APPARATUS FOR REPAIRING TRAILER BRAKES

(76) Inventor: Gordon Clunie, 115 - 71st Street, Saskatoon, Saskatchewan (CA)

( * ) Notice: Subject to any disclaimer, the term of this patent is extended or adjusted under 35 U.S.C. 154(b) by 0 days.

(21) Appl. No.: 09/759,544

(22) Filed: Jan. 12, 2001

(65) Prior Publication Data

US 2001/0029652 A1 Oct. 18, 2001

(51) Int. Cl.[7] .......................... B23B 41/00; B23B 45/14
(52) U.S. Cl. .................... 408/115 R; 408/79; 408/97
(58) Field of Search .................. 408/72 R, 115 R, 408/79, 97, 241 B, 124

(56) References Cited

U.S. PATENT DOCUMENTS

| | | | |
|---|---|---|---|
| 2,924,128 A | * | 2/1960 | Lucker, Jr. ............... 408/115 R |
| 3,131,583 A | * | 5/1964 | Hanley et al. .......... 408/115 R |
| 3,736,067 A | * | 5/1973 | Akins .......................... 408/137 |

FOREIGN PATENT DOCUMENTS

| | | | |
|---|---|---|---|
| FR | 2635706 A | * 3/1990 | ............... 408/72 R |

* cited by examiner

*Primary Examiner*—Daniel W. Howell
(74) *Attorney, Agent, or Firm*—Frost Brown Todd LLC

(57) ABSTRACT

A method for repairing worn brake assembly holes on a highway trailer axle assembly including a cam shaft hole, and first and second anchor pin holes and including an axle stub extending from an end thereof, comprising the steps of aligning a boring tool, having a tool axis, with each brake assembly hole axis by aligning the tool axis parallel with the stub axis; positioning the tool axis at a distance from the stub axis equal to the distance of the brake assembly hole axis from the stub axis; and positioning the tool axis at an angular position relative to the brake assembly hole axis that is equal to the angular position of the brake assembly hole axis relative to the axis of another of the brake assembly holes. The aligned boring tool is then driven to bore an oversize hole through the worn brake assembly hole such that the worn brake assembly hole, including any worn extremities thereof, is consumed by the oversize hole, leaving a substantially cylindrical oversize hole. An oversize bushing is installed in the oversize hole having an inner diameter suitable to accommodate a brake cam shaft or anchor pin therethrough. An apparatus is also provided.

10 Claims, 4 Drawing Sheets

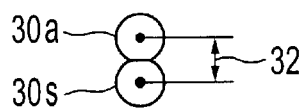 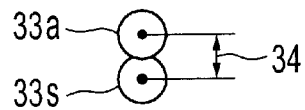 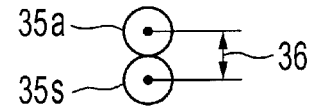
FIG. 7  FIG. 8  FIG. 9
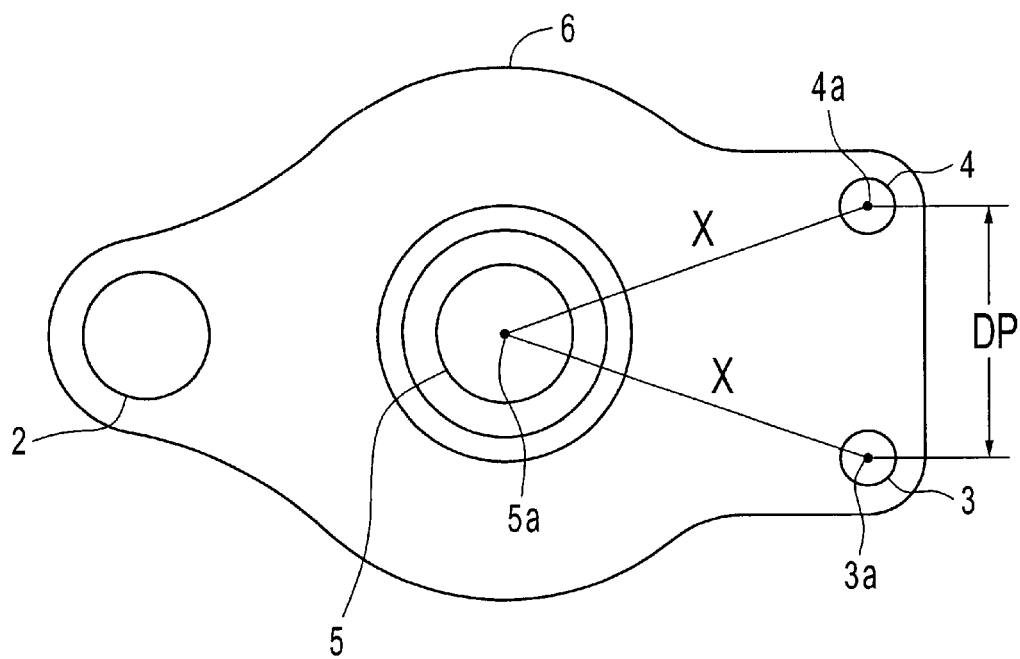
FIG. 10

METHOD AND APPARATUS FOR REPAIRING TRAILER BRAKES

This invention is in the field of highway trailer brakes, and in particular the maintenance and repair thereof.

BACKGROUND

Highway trailer brakes are the subject of increasing scrutiny from those responsible for highway safety. RockwellJ and Pro-ParJ are two of the more common brands of trailer axle assemblies. These assemblies incorporate an axle stub at each end thereof for attachment of a wheel via bearings and so forth. At each thereof there is also mounted a "spider" which provides brake assembly holes to hold the brake mechanism in the proper location relative to the axle stub. On one side of the axle stub a cam shaft, for moving the brakes, passes through a cam shaft hole in the spider. On the opposite side are two anchor pin holes where the brake shoes are retained. The rotating action of the cam shaft causes the brake shoes to pivot in the anchor pin holes and move relative to the brake drum located on the wheel, thereby applying or releasing the brakes.

The proper location and size of the cam shaft and anchor pin holes is critical to proper brake operation and performance. The holes are bushed, and the bushings may be replaced periodically, however eventually the holes become worn so that the replacement bushings are loose in the holes. The brakes then will have excessive play in them, and will not operate satisfactorily.

Conventionally, the axle is replaced, or alternatively the spider may be cut off and a new spider installed. Removing the old spider and installing a new one is time consuming and strenuous, since the wheels, brakes and shafts must be assembled on the axle to ensure that the new spider is properly located; the new spider is then tacked in place, and the wheels, brakes and shafts removed so that the new spider may be welded in place. The entire process takes several hours for skilled workers to complete.

SUMMARY OF THE INVENTION

It is the object of the present invention to provide a method and apparatus for repairing the cam shaft and anchor pin holes in RockwellJ, Pro-ParJ or similar trailer axle assemblies which does not require replacement of the spider, but rather repairs the holes in the original spider.

A boring tool is located at the proper distance from, and in alignment with, the axle and bores slightly over-size holes in the spider with the centers thereof in the same location as the centers of the original holes and at substantially the same location as the worn out holes. The extra diameter overcomes the distortion of the worn holes, providing a cylindrical unworn hole which properly accommodates an oversize outside diameter bushing with the same inside diameter as the original. The shafts are thus held in their proper location relative to the axle, and play is eliminated. The apparatus provided for practicing the method is convenient and allows for completion of the repair in substantially less time than is required to replace the spider.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIGS. 7, 8 and 9 are end views of the offset location pins;

FIG. 10 is an end view of a Pro-ParJ axle assembly and spider.

DETAILED DESCRIPTION OF THE ILLUSTRATED EMBODIMENTS

Figure 1:
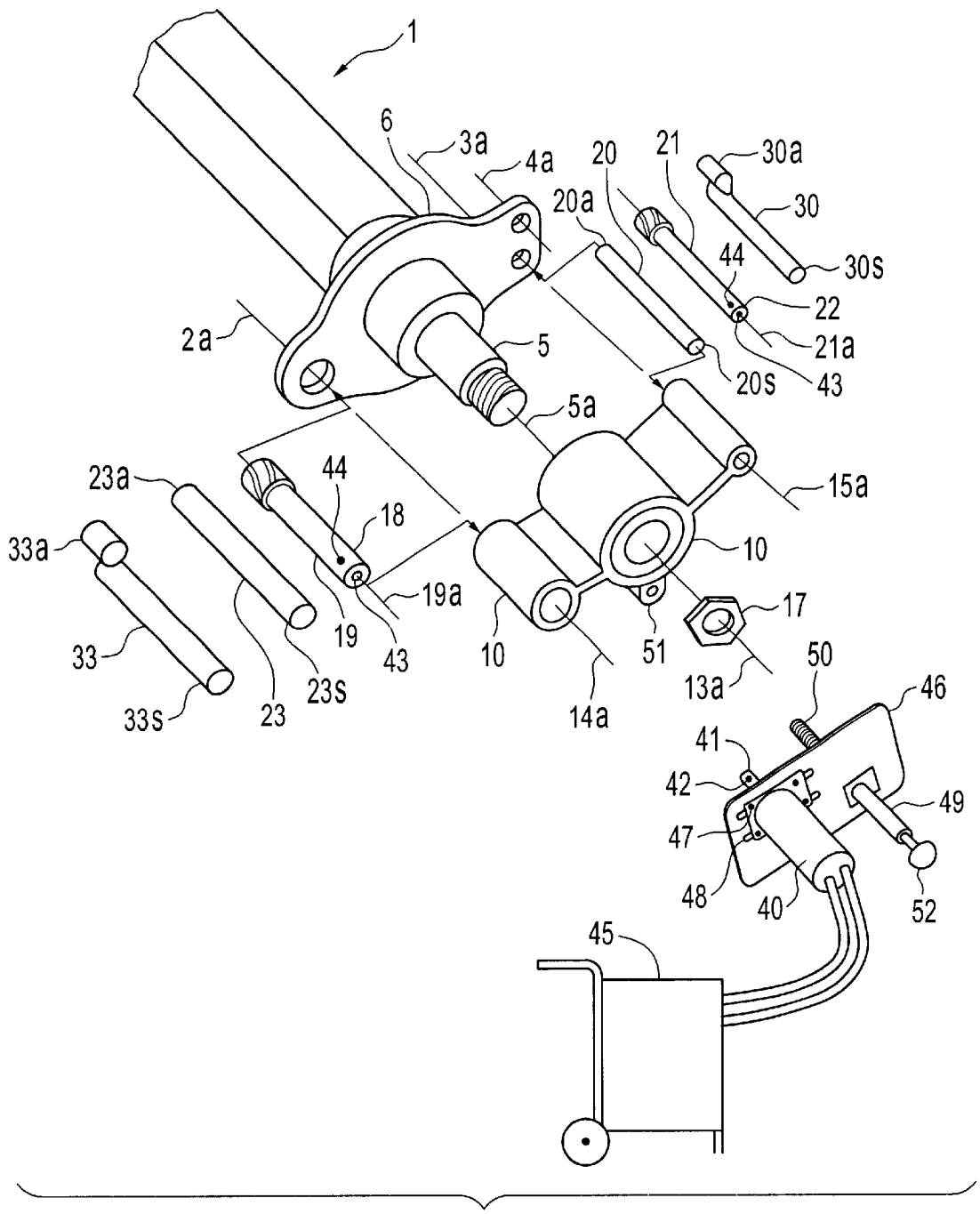
FIG. 1 is a perspective view of an apparatus for repairing brake assembly holes.
Figure 2:
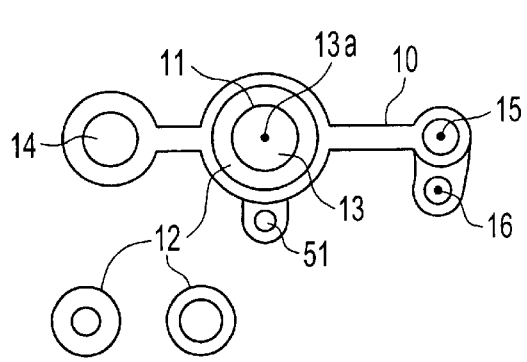
FIG. 2 is an end view of the swivel block.

A highway trailer axle assembly 1 is illustrated in FIG. 1. The axle assembly 1 includes a spider 6 defining a cam shaft hole 2, having a cam shaft hole axis 2a, and first and second anchor pin holes 3, 4 having first and second anchor pin hole axes 3a, 4a. The axle assembly 1 also includes an axle stub 5 extending from an end thereof as illustrated. The axle stub 5 has a stub axis 5a parallel to the cam shaft hole axis 2a and the first and second anchor pin hole axes 3a, 4a.

Figure 4:
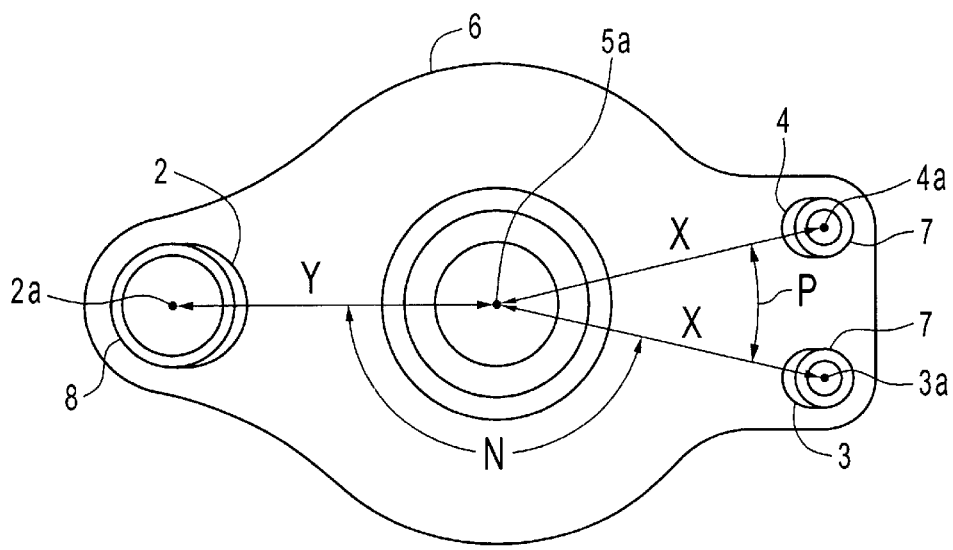
FIG. 4 is an end view of a RockwellJ axle assembly and spider showing the worn brake assembly holes.

As best seen in FIG. 4, first and second anchor pin hole axes 3a, 4a are equidistant from the stub axis 5a a distance X and have equal diameters for accommodating equal size anchor pin bushings 7 and anchor pin shafts (not illustrated). Cam shaft hole 2 similarly accommodates a cam shaft bushing 8. The assembly of brake shoes, cam operating shaft and the like on the axle assembly 1 is well known and is not further illustrated.

Figure 5:
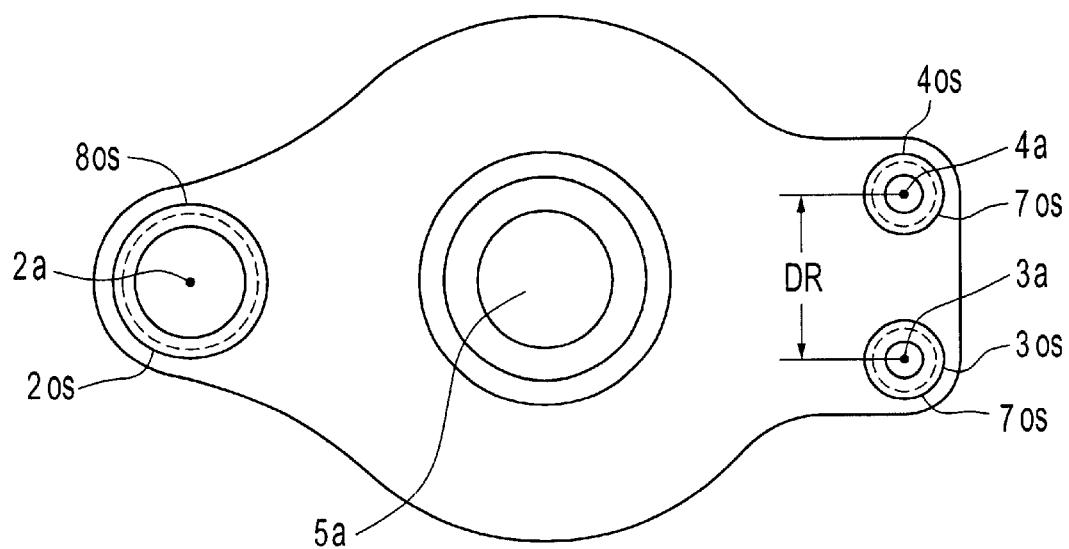
FIG. 5 is an end view of a RockwellJ axle assembly and spider showing the oversize brake assembly holes.
Figure 6:
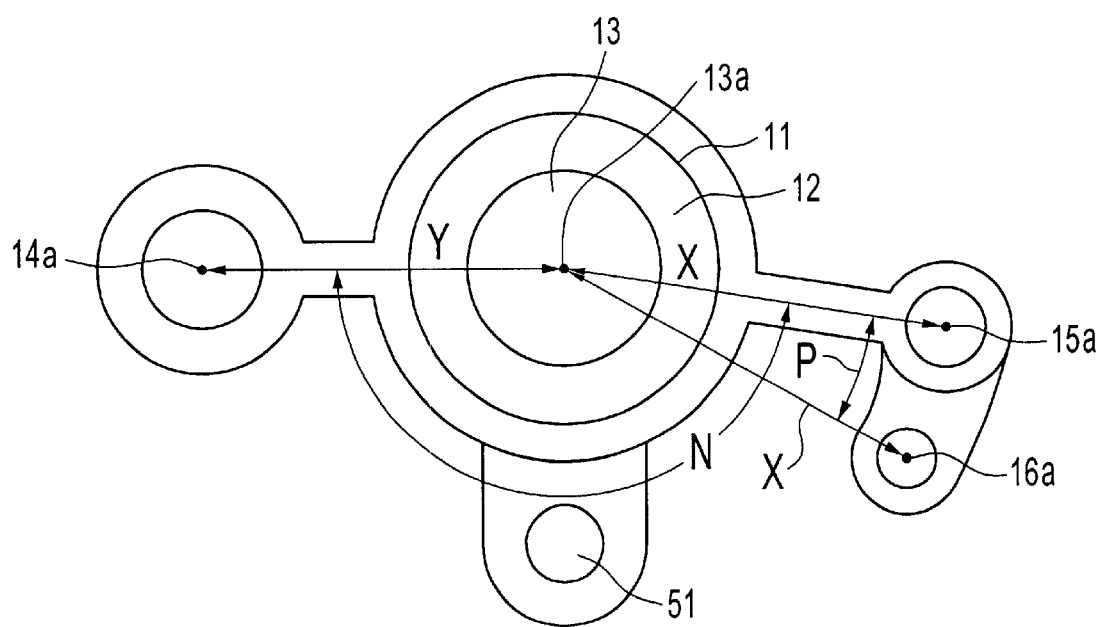
FIG. 6 is an end view of the swivel block.

As can be seen in FIG. 4, the cam shaft hole 2 and anchor pin holes 3, 4 are worn into elongated ovals, in which the cylindrical bushings 7 and 8 can move, causing the brakes to operate improperly and necessitating the repair of the present invention. Illustrated in FIG. 5 are the oversize holes 2os, 3os and 4os with respective axes at the original axis 2a, 3a, and 4a. The oversize holes 2os, 3os and 4os consume all the original holes 2, 3 and 4 (shown by the phantom lines), including the worn extremities thereof, leaving substantially cylindrical oversize holes. Oversize bushings 7os and 8os have inside diameters equal to those of the original bushings 7 and 8, and outside diameters suitable for press fitting in the oversize holes 2os, 3os and 4os.

The apparatus to make the oversize holes 2os, 3os and 4os includes swivel block 10 illustrated in FIGS. 1, 2, 3, and 6. The swivel block 10 defines a base aperture 11 into which is inserted a shimming bushing 12. The shimming bushing 12 defines central cylindrical aperture 13, having a central axis 13a. Central cylindrical aperture 13 is sized and adapted to receive the axle stub 5 rotatably therein such that central axis 13a and stub axis 5a coincide by selecting one of a plurality of shimming bushings 12 to fit the diameter of the axle stub 5 which may vary.

The swivel block 10 also defines a first cylindrical aperture 14 having a first aperture axis 14a parallel to central axis 13a and at a distance Y from the central axis 5a equal to the distance Y of the cam shaft hole axis 2a from the stub axis 5.

The swivel block 10 also defines a second cylindrical aperture 15 having a second aperture axis 15a parallel to central axis 13a and at an angular position N relative to the first aperture axis 14a that is equal to the angular position N of the cam shaft hole axis 2a relative to the first anchor pin hole axis 3a. The second aperture axis 15a is located at a distance X from the central axis 13a equal to the distance X of the first anchor pin hole axis 3a from the stub axis 5.

Thus, with the swivel block 10 installed on the axle stub 5 and held in place by nut 17, when the first aperture axis 14a is aligned with the cam shaft hole axis 2a, the second aperture axis 15a is aligned with the first anchor pin hole axis 3a.

The swivel block 10 also defines a third cylindrical aperture 16 having a third aperture axis 16a parallel to central axis 13a and positioned such that, with the swivel block 10 installed on the axle stub 5, when third aperture axis 16a is aligned with first anchor pin hole axis 3a, second aperture axis 15a is aligned with second anchor pin hole axis 4a. Third aperture axis 16a is located at an angular position P relative to second aperture axis 15a that is equal to the angular position P of the first anchor pin hole axis 3a to second anchor pin axis 4a, and at a distance X from central axis 13a equal to the distance X of first and second anchor pin hole axes 3a, 4a from stub axis 5a.

The apparatus includes a first boring tool 19 having a first tool axis 19a and having a first boring diameter equal to the diameter of the oversize cam shaft hole 2 os. This diameter is larger than the largest dimension of the cam shaft hole 2, including any worn extremities thereof as illustrated in FIG. 5. The first boring tool 19 includes a first tool shaft 18 having a diameter substantially equal to the diameter of the first cylindrical aperture 14 such that the the shaft may slide and rotate therein while keeping the first tool axis 19a aligned with the first aperture axis 14a.

To properly locate the first boring tool 19, a first locating pin 20 has a swivel end 20s and an axle end 20a. The swivel end 20s has a diameter substantially equal to the diameter of the second cylindrical aperture 15 and the axle end 20a has a diameter substantially equal to the diameter of the anchor pin holes 3, 4. The first locating pin 20 is inserted to align first anchor pin hole axis 3a with second aperture axis 15a, which thereby aligns first aperture axis 14a with cam shaft hole axis 2a. The first boring tool axis 19a is thus aligned with cam shaft hole axis 2a and will bore oversize cam shaft hole 2os with a center on the cam shaft hole axis 2a as shown in FIG. 5.

While the anchor pin hole 3 is worn, the dimension of wear is primarily radial to the axle stub 5, as shown in FIG. 4, and less worn in the angular directions N and P. In the majority of cases, the angular position N may be determined with sufficient accuracy for the purposes of the repair.

Thus in operation the first tool axis 19a of the first boring tool 19 is aligned with the cam shaft hole axis 2a. The swivel block 10 secured on the axle stub 5 by nut 17 aligns the first tool axis 19a, which is coincidental with first aperture axis 14a, parallel with the stub axis 5a at a distance from the stub axis 5 equal to the distance of the cam shaft hole axis 2a from the stub axis 5a. Insertion of the first locating pin 20 as described positions the first aperture axis 14a at an angular position N relative to the first anchor pin hole axis 3a that is equal to the angular position N of the cam shaft hole axis 2a relative to the first anchor pin hole axis 3a. The aligned first boring tool 19 is then driven rotationally and axially to bore the oversize cam shaft hole 2os through the cam shaft hole 2 such that the cam shaft hole 2, including any worn extremities thereof, is consumed by the oversize cam shaft hole 2os, leaving a substantially cylindrical oversize cam shaft hole 2os as illustrated in FIG. 5. An oversize cam shaft bushing 8os, having an inner diameter suitable to accommodate a cam shaft therethrough, is installed in the oversize cam shaft hole 2os.

In order to repair the first anchor pin hole 3, the apparatus includes a second boring tool 21 having a second tool axis 21a and having a second boring diameter larger than the largest dimension of the anchor pin holes 3 and 4, including any worn extremities thereof. The second boring tool 21 includes a second tool shaft 22 having a diameter substantially equal to the diameter of the second cylindrical aperture 15, such that the shaft 22 may slide and rotate therein while keeping the second tool axis 21a aligned with the second aperture axis 15a.

To properly locate the second boring tool 21, a second locating pin 23, has a swivel end 23s and an axle end 23a. The swivel end 23s has a diameter substantially equal to the diameter of the first cylindrical aperture 14 and the axle end 23a has a diameter substantially equal to the diameter of the oversize cam shaft hole 2os, or to the inside diameter of the oversize cam shaft bushing 8os installed therein. The oversize cam shaft bushing 8os may be installed before repairing the first anchor pin hole 3, or after. The axle end 23a of the second locating pin 23 can be sized to accommodate either order of operations.

In order to repair the second anchor pin hole 4, the apparatus includes a third locating pin 25 having a swivel end 25s and an axle end 25a. The swivel end 25s has a diameter substantially equal to the diameter of the third cylindrical aperture 16a and the axle end 25a has a diameter substantially equal to the diameter of the oversize anchor pin hole 3os, or to the inside diameter of the oversize anchor pin bushing 7os installed therein.

To repair the anchor pin holes 3 and 4, axle end 23a of the second locating pin 23 is inserted into oversize cam shaft hole 2os or oversize cam shaft bushing 8os as the case may be, and the swivel end 23s thereof is inserted into first aperture 14. Because of the previously described orientation of the apertures defined by the swivel block 10, the second tool shaft 22 of the second boring tool 21 may be inserted in second cylindrical aperture 15 and the second tool axis 21a and first anchor pin hole axis 3a will be aligned.

The aligned second boring tool 21 is then driven rotationally and axially to bore the first oversize anchor pin hole 3os through the first anchor pin hole 3 such that the anchor pin hole 3, including any worn extremities thereof, is consumed by the oversize anchor pin hole 3os, leaving a substantially cylindrical first oversize anchor pin hole 3os as illustrated in FIG. 5. An oversize anchor pin bushing 7os, having an inner diameter suitable to accommodate an anchor pin therethrough, may be installed in the first oversize anchor pin hole 3os.

Figure 3:
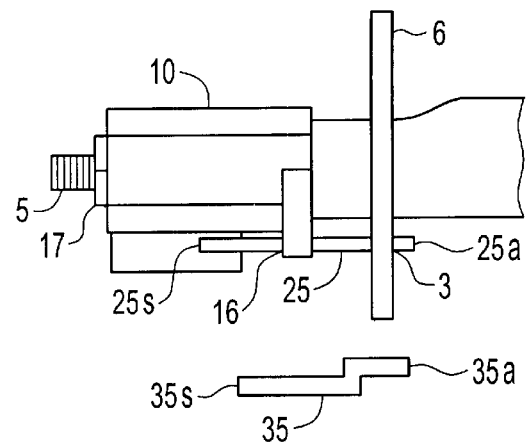
FIG. 3 is a side view of the swivel block in position on the axle stub.

The second locating pin 23 is removed and the swivel block is rotated so that third aperture axis 16a is aligned with first anchor pin hole axis 3a, as illustrated in FIG. 3. The axle end 25a of the third locating pin 25 is inserted into first oversize anchor pin hole 3os or oversize anchor pin bushing 7os as the case may be, and the swivel end 25s thereof is inserted into third cylindrical aperture 16. Again, the second tool shaft 22 of the second boring tool 21 may be inserted in second cylindrical aperture 15 with the result that the second tool axis 21a and second anchor pin hole axis 4a will be aligned. By the same process described above, second oversize anchor pin hole 4os is bored and an oversize anchor pin bushing 7os may be installed therein.

The distance between anchor pin holes varies with the brand of axle assembly. In FIGS. 1–5 a RockwellJ brand axle is illustrated where the anchor pin hole axes 3a, 4a are separated by distance DR. In the Pro-ParJ axle illustrated in FIG. 7, the anchor pin hole axes 3a, 4a are separated by a greater distance DP. In both brands, the distance X from the stub axis 5*a* to each anchor pin hole is the same. The distance from the stub axis 5*a* to the cam shaft hole axis 2*a* is the same in both brands and so the same swivel block 10 can then be used to repair both brands, however offset location shafts must be used to properly align the boring tool axes 19*a*, 21*a* with the cam shaft and anchor pin hole axes, 2*a*, 3*a*, 4*a*.

First offset locating pin 30 has axle and swivel ends 30*a*, 30*s* that are the same diameter as those of first locating pin 20. The offset distance 32 is such that when the swivel end 30*s* is inserted in the second cylindrical aperture 15, and the axle end 30*a* is inserted in the first anchor pin hole 3, the first aperture axis 14*a* is aligned with the cam shaft hole axis 2*a* and first boring tool 19 may be used as described above to bore oversize cam shaft hole 2*os*.

To repair first anchor pin hole 3, a second offset locating pin 33 is provided having axle and swivel ends 33*a*, 33*s* that are the same diameter as those of second locating pin 23. The offset distance 34 is such that when the swivel end 33*s* is inserted in the first cylindrical aperture 14, and the axle end 33*a* is inserted in the oversize cam shaft hole 2*os*, the second aperture axis 15*a* is aligned with the first anchor pin hole axis 3*a* and second boring tool 21 may be used as described above to bore first oversize anchor pin hole 3*os*.

To repair second anchor pin hole 4, a third offset locating pin 35 is provided having axle and swivel ends 35*a*, 35*s* that are the same diameter as those of third locating pin 25. The offset distance 36 is such that when the swivel end 35*s* is inserted in the third cylindrical aperture 15, and the axle end 35*a* is inserted in the first oversize anchor pin hole 3*os*, the second aperture axis 15*a* is aligned with the second anchor pin hole axis 4*a* and second boring tool 21 may be used as described above to bore first oversize anchor pin hole 3*os*.

Again, bushings may be installed during the process or after all oversize holes have been bored.

To drive the first and second boring tools 19, 21 a hydraulic motor 40 is releasably attachable to the first and second tool shafts 18, 22. The illustrated attachment is by inserting motor shaft 41, with a key inserted into key slot 42, into bores 43 in the ends of tool shafts 18, 22 and tightening lock screw 44. Any known releasable attachment would suffice as well. A portable source of pressurized hydraulic fluid 45 is provided for driving the hydraulic motor 40.

The hydraulic motor 40 is attached to a drive plate 46 by bolts 47 through slotted holes 48 to provide for any needed lateral adjustments. To drive the first and second boring tools 19, 21 along the first and second tool axes 19*a*, 21*a* to bore the oversize cam shaft and anchor pin holes 2*os*, 3*os*, 4*os*, a threaded advancing mechanism 49 is provided acting between the swivel block 10, which is secured against axial movement by nut 17, and the hydraulic motor 40. Threaded rod 50 engages mating threads in drive aperture 51 defined by the swivel block 10, and is rotated manually by knob 52. Thus the drive plate 46, and attached hydraulic motor 40 and drive tool 19 or 21, are moved axially to bore the required oversize holes.

A drive mechanism utilising an electric or other drive motor could be used as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An apparatus for repairing a worn cam shaft hole on a highway trailer axle assembly, said axle assembly including a cam shaft hole having a cam shaft hole axis, and first and second anchor pin holes having first and second anchor pin hole axes equidistant from said stub axis and having equal diameters for accommodating equal size anchor pin bushings and anchor pin shafts, and including an axle stub extending from an end thereof, said axle stub having a stub axis parallel to said cam shaft hole axis and said first and second anchor pin hole axes, said apparatus comprising:

a swivel block defining:
  a central cylindrical aperture, having a central axis and adapted to receive said axle stub rotatably therein such that said central axis and said stub axis coincide;
  a first cylindrical aperture having a first aperture axis at a distance from said central axis equal to the distance of said cam shaft hole axis from said stub axis;
  a second cylindrical aperture having a second aperture axis at a distance from said central axis equal to the distance of said first anchor pin hole axis from said stub axis;

a first boring tool having a first tool axis and having a first boring diameter larger than the largest dimension of said cam shaft hole, including any worn extremities thereof, said first boring tool including a first tool shaft having a diameter substantially equal to the diameter of said first cylindrical aperture;

a first locating pin having a swivel end, and an axle end at an offset from said swivel end, said swivel end having a diameter substantially equal to the diameter of said second cylindrical aperture and said axle end having a diameter substantially equal to the diameter of said anchor pin holes wherein said offset is such that when said swivel end is inserted in said second cylindrical aperture, and said axle end is inserted in said first anchor pin hole, said first aperture axis is aligned with said cam shaft hole axis;

means for driving said boring tool.

2. The apparatus of claim 1 further comprising a plurality of shimming bushings for changing the diameter of said central cylindrical aperture to receive axle stubs with different diameters.

3. An apparatus for repairing a worn cam shaft hole on a highway trailer axle assembly, said axle assembly including a cam shaft hole having a cam shaft hole axis, and first and second anchor pin holes having first and second anchor pin hole axes equidistant from said stub axis and having equal diameters for accommodating equal size anchor pin bushings and anchor pin shafts, and including an axle stub extending from an end thereof, said axle stub having a stub axis in alignment with said cam shaft hole axis and said first and second anchor pin hole axes, said apparatus comprising:

a swivel block defining:
  a central cylindrical aperture, having a central axis and adapted to receive said axle stub rotatably therein such that said central axis and said stub axis coincide;
  a first cylindrical aperture having a first aperture axis parallel to said central axis and at a distance from said central axis equal to the distance of said cam shaft hole axis from said stub axis; and
  a second cylindrical aperture having a second aperture axis parallel to said central axis and at an angular position relative to said first aperture axis that is equal to the angular position of said cam shaft hole axis relative to said first anchor pin hole axis, said second aperture axis located at a distance from said central axis equal to the distance of said first anchor pin hole axis from said stub axis;

a first boring tool having a first tool axis and having a first boring diameter larger than the largest dimension of said cam shaft hole, including any worn extremities thereof, said first boring tool including a first tool shaft having a diameter substantially equal to the diameter of said first cylindrical aperture;

a first locating pin having a swivel end and an axle end, said swivel end having a diameter substantially equal to the diameter of said second cylindrical aperture and said axle end having a diameter substantially equal to the diameter of said anchor pin holes;

means for driving said boring tool.

4. The apparatus of claim 3 for repairing at least one anchor pin hole, the apparatus further comprising:

a second boring tool having a second tool axis and having a second boring diameter larger than the largest dimension of said anchor pin holes, including any worn extremities thereof, said second boring tool including a second tool shaft having a diameter substantially equal to the diameter of said second cylindrical aperture;

a second locating pin having a swivel end and an axle end, said swivel end having a diameter substantially equal to the diameter of said first cylindrical aperture and said axle end having a diameter substantially equal to the diameter of said first boring diameter, or to the inside diameter of a cam shaft bushing installed in said cam shaft hole after same has been bored with said first boring tool;

means for driving said second boring tool.

5. The apparatus of claim 4 for repairing both anchor pin holes, the apparatus further comprising:

a third cylindrical aperture, defined by said swivel block and having a third aperture axis parallel to said central axis and positioned such that when said stub axle is received in said central aperture with said central and stub axes coinciding, said third aperture axis is aligned with said first anchor pin hole axis, and said second aperture axis is aligned with said second anchor pin hole axis;

a third locating pin having a swivel end and an axle end, said swivel end having a diameter substantially equal to the diameter of said third cylindrical aperture and said axle end having a diameter substantially equal to the diameter of said second boring diameter, or to the inside diameter of an anchor pin bushing installed in said anchor pin hole after same has been bored with said second boring tool.

6. The apparatus of claim 3 wherein said means for driving said first and second boring tools comprises:

a hydraulic motor releasably attachable to said first and second tool shafts;

a portable source of pressurized hydraulic fluid for driving said hydraulic motor;

a threaded advancing mechanism acting between said swivel block and said hydraulic motor for moving said first or second boring tool along said first or second tool axis to bore said oversize cam shaft and anchor pin holes;

wherein said swivel block is secured axially on said axle stub so that same may rotate thereon but is prevented from moving along said stub axis.

7. The apparatus of claim 3 further comprising a plurality of shimming bushings for changing the diameter of said central cylindrical aperture to receive axle stubs with different diameters.

8. The apparatus of claim 1 wherein said means for driving said first and second boring tools comprises:

a hydraulic motor releasably attachable to said first and second tool shafts;

a portable source of pressurized hydraulic fluid for driving said hydraulic motor;

a threaded advancing mechanism acting between said swivel block and said hydraulic motor for moving said first or second boring tool along said first or second tool axis to bore said oversize cam shaft and anchor pin holes;

wherein said swivel block is secured axially on said axle stub so that same may rotate thereon but is prevented from moving along said stub axis.

9. The apparatus of claim 1 for repairing at least one anchor pin hole, the apparatus further comprising:

a second boring tool having a second tool axis and having a second boring diameter larger than the largest dimension of said anchor pin holes, including any worn extremities thereof, said second boring tool including a second tool shaft having a diameter substantially equal to the diameter of said second cylindrical aperture;

a second locating pin having a swivel end, and an axle end at an offset from said swivel end, said swivel end having a diameter substantially equal to the diameter of said first cylindrical aperture and said axle end having a diameter substantially equal to the diameter of said first boring diameter, or to the inside diameter of a cam shaft bushing installed in said cam shaft hole after same has been bored with said first boring tool, wherein said offset is such that when said swivel end is inserted in said first cylindrical aperture, and said axle end is inserted in said cam shaft hole after same has been bored with said first boring tool or said cam shaft bushing, said second aperture axis is aligned with said first anchor pin hole axis;

means for driving said second boring tool.

10. The apparatus of claim 9 for repairing at both anchor pin holes, the apparatus further comprising a third cylindrical aperture, defined by said swivel block, and having a third aperture axis located at a distance from said central axis equal to the distance of said first and second anchor pin hole axes from said stub axis;

a third locating pin having a swivel end, and an axle end at an offset from said swivel end, said swivel end having a diameter substantially equal to the diameter of said third cylindrical aperture and said axle end having a diameter substantially equal to the diameter of said second boring diameter, or to the inside diameter of an anchor pin bushing installed in said first anchor pin hole after same has been bored with said second boring tool, wherein said offset is such that when said swivel end is inserted in said third cylindrical aperture, and said axle end is inserted in said first anchor pin hole after same has been bored with said second boring tool or said anchor pin bushing, said second aperture axis is aligned with said second anchor pin hole axis.

* * * * *